Sept. 25, 1951 — P. J. McGAULEY ET AL — 2,568,963
PROCESS FOR THE RECOVERY OF COPPER FROM ITS ORES AND MINERALS
Filed June 4, 1949 — 2 Sheets—Sheet 1

Patented Sept. 25, 1951

2,568,963

UNITED STATES PATENT OFFICE 2,568,963

PROCESS FOR THE RECOVERY OF COPPER FROM ITS ORES AND MINERALS

Patrick J. McGauley, Glen Cove, and Edward S. Roberts, New York, N. Y., assignors to Chemical Construction Corporation, New York, N. Y., a corporation of Delaware Application June 4, 1949, Serial No. 97,224

4 Claims. (Cl. 75—115)

This invention is concerned with production of powdered metallic copper. It deals with processes whereby copper-bearing mixtures, particularly mixtures of copper-bearing and iron-bearing minerals, are treated to convert the copper content to copper sulfate; and subsequently copper is precipitated from a solution of the sulfate.

More particularly, the present invention is concerned with the treatment of such copper-bearing mixtures to obtain an enriched concentrate of copper sulfide by replacing other metals with copper. Still more specifically, in precipitating the powdered copper metal, only that portion of the copper available, as copper sulfate, is precipitated which can be brought down in sufficient purity. The residual available copper in solution is used to eliminate other metals, such as the iron noted above, from the system in the replacement reaction.

Many of the dissolving operations previously proposed were not as universally adaptable as might be desired. Some were essentially limited to the treatment of oxidized copper minerals. Others were really suitable only for sulfide ores. Many were inefficient and/or required excessive equipment. Some lost their efficiency when salts of iron, or other metals higher than copper in the electromotive series, were present in the ore. None were suitable for treatment of materials having present not only oxidized copper and copper sulfide minerals but also iron sulfides.

In addition to the problem of separating the copper from the gangue material, by placing it in solution, there is also the problem of obtaining the copper chemically from solution. Again, proposals to overcome a number of obstacles have been made. However, in none of the previous proposals have all of these obstacles been successfully overcome. Among others, for example, the processes involve steps which could not readily be adapted to continuous production; or were necessarily restricted to the recovery of limited amounts of ore. Others produced the metal in forms unsuitable for industrial use. Some processes amounted to no more than purification of copper previously obtained by some other method.

This problem of product purity is particularly troublesome. Copper metal, to be industrially saleable must meet so-called "electrolytic" standards. In other words, the copper content of the metal plus any minor silver content, must be 99.9% or better. In the past, the chemical processes which were available either could not produce copper of this purity or if capable of approximating this purity, did not operate with a commercially useful efficiency in recovering the copper.

Nevertheless, there is a constantly increasing demand for a procedure of this type which is not subject to the limitations and difficulties of these earlier attempts at chemical leaching and chemical precipitation. It is, therefore, a principal object of the present invention to provide a method capable of economically concentrating the copper values in the source materials, converting the concentrate to a solution of copper salts and chemically precipitating copper from a solution of those salts.

Quite surprisingly, particularly in view of the long period of time over which a process has been found desirable without its being developed, the problem has been solved by a continuous process which fulfills the desired objects. As is noted above, a principal feature of this novel process is its utilization of a replacement reaction, whereby the copper content of the feed is augmented by copper sulfide precipitated in the elimination of other metals from the system.

Having obtained, by means of the replacement reaction, an enriched copper-bearing slurry, in which the copper content is considerably higher than in the materials being treated, the remainder of the process is straightforward. The enriched slurry is subjected to oxidation in the presence of excess sulfuric acid, the copper being converted to copper sulfate in solution, either directly or after a purification in which the salt is separated out by crystallization and redissolved, and is treated with carbon monoxide to precipitate part of the copper content thereof with carbon monoxide.

When thus broadly stated, the process appears simple. In its entirety, however, the appearance is more deceptive than real. In its entirety, the process is essentially the combination of steps, several of which are necessarily novel. In each of the steps a considerable degree of care must be exercised.

The overall process embodying the essential features of the present invention may probably be more readily understood by being described in conjunction with the accompanying drawing. The latter constitutes simplified flow sheets showing the basic operations of the combination of steps which, when taken together, comprise the process of the present invention.

Figure 1:
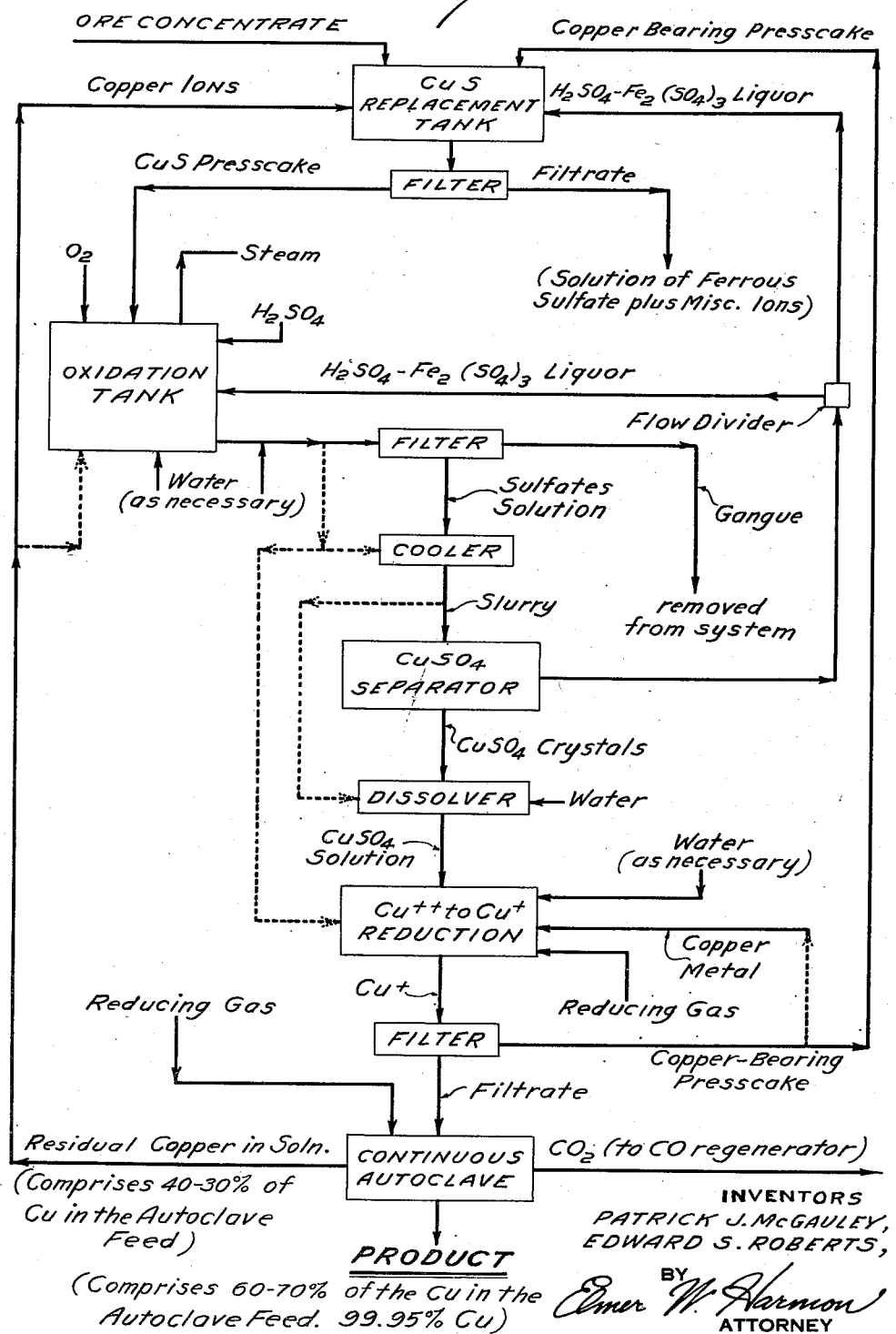
Figure 1 is a flow sheet showing one modification of the general procedure.

As will be seen by reference to Figure 1, material treated in the present process is designated as 'concentrate" or "ore concentrate."

While it is perfectly feasible to adjust the process of the present invention to treat ore as mined, it will be seldom desirable to do so. Copper ore is usually subjected to some preliminary concentrating operation. This is an art of itself, with which the present invention is not particularly concerned.

From the flow sheet, it will be seen that the first step in the actual process of the present invention is designated as a copper sulfide replacement. This step constitutes one of the more novel features of the process of the present invention. It is highly flexible and may be adjusted to cover many different operation conditions, and to cope with the requirements presented by many different ores. Its flexibility will be more fully discussed below.

As shown in Figure 1, it is used in perhaps its most simple combination, with the other steps of the present invention.

In actually carrying out the operation, several different materials are fed to a replacement tank. One of these is the feed or ore concentrate. Another is an aqueous acid solution containing free copper ions. As shown in Figure 1, additional acid is also provided by a sulfuric acid ferric sulfate liquor. Once operation is stabilized, these solutions will be furnished by recirculation. In Figure 1, it is assumed that operations are in equilibrium and are in normal flow during continuous operation.

It is to be noted that copper ions are fed to the tank in one solution and a different solution, comprising sulfuric acid and ferric sulfate, is also fed to the tank. The iron, as so fed, does not enter into the actual reaction, but, as will be noted below, passes through this operation in being removed from the system. Actually, these two solutions need not be separately fed. They may be one single solution. Copper ions to start operations may be obtained by dissolving copper sulfate or by leaching an ore containing oxidized copper minerals with sulfuric acid. Sulfuric acid, in starting operations, may be furnished directly as aqueous sulfuric acid solution.

In any case, whether by special solution or by recirculation, the concentrate is treated in the replacement tank with copper ions and in acid solution. The net result is the replacement of iron sulfides in the feed solids by copper sulfide precipitated from the copper in solution. At the same time, sulfur, in the iron sulfide, is exchanged for sulfate ions in the solution of dissolved copper salts. In this way, replaced iron sulfide from the feed solids is converted to soluble ferrous sulfate.

While it is essential to strip all copper from the solution of copper salts entering the replacement tank, this result does not depend on any particular copper-iron ratio in the liquor at any one time. It is essential only that sufficient iron be added in the feed solids to be at least equivalent to the copper in solution. Experience has shown that the aqueous sulfuric acid ferric sulfate treating liquor, as introduced, should contain about 5–15% sulfuric acid and may contain varied amounts of soluble iron sulfate. Since all the ferric sulfate must be reduced to ferrous sulfate before any effective replacement can occur, it is desirable to keep the ferric sulfate low, although it is inevitable that some be present, as will be seen from further considerations below. In ordinary operations, the ferric sulfate may run about 2–15%. Such liquors are readily obtained by recirculation from subsequent steps in the flow sheet.

At the end of the replacement reaction, materials will be present in the form of a slurry. This slurry is drawn from the tank and filtered, as shown in Figure 1. From the filter is obtained a copper sulfide presscake, in which the copper sulfide content is much higher and the iron sulfide content is much lower than was found in the original feed concentrate. This presscake is carried through the remainder of the process of the present invention.

The filtrate obtained in this operation is sent out of the circuit of the present process. So far as the latter is concerned, this constitutes the principal point of discard. The liquor sent from the circuit is substantially barren of utilizable copper content. It will contain, however, besides the ferrous and ferric sulfates, an assortment of miscellaneous soluble dissolved salts. Among these may be found those of zinc, nickel, cobalt, and the like. The filtrate, therefore, may not be valueless. It is not an actual discard in such cases but is sent to some further processing which, since it forms no part of the present flow sheet, is not shown.

In the more direct line of the present process, it is the copper sulfide presscake which is sent to the oxidation tank. In this step, the presscake is treated with sulfuric acid and ferric sulfate-sulfuric acid solution. Ferric sulfate, for the operation, is obtained by recirculation. In starting up, it can be dissolved especially and added for the purpose.

Oxidation is conducted under heat and pressure. In most cases the temperature conditions will range from about 100° C. up to about 325° C. Preferably, the operating temperature is maintained as low as is possible for the characteristics of the ore being treated. Operating pressure will depend upon whether the oxidizing gas is oxygen, air or oxygen-enriched air. When using oxygen, the pressure at the higher end of the temperature range may go up to 350–500 pounds per square inch gauge. Using air, at these temperatures, pressure may range up to about 500–750 pounds per square inch gauge.

Once the oxidation reaction begins there is no problem in obtaining these conditions. On the contrary, the reaction is highly exothermic and it will be necessary to bleed steam from the tank in order to keep below the maximum desirable temperature and pressure conditions. Actually, there is no particular harm in going above the stated temperature and pressure conditions. Since it is not necessary to do so, such practice is uneconomical and may not be possible in equipment which is otherwise usable. The oxidized product, so far as the present invention is concerned, will constitute principally a solution of copper and iron sulfates. Usually in addition thereto there will be a considerable amount of gangue. To eliminate the latter, the oxidized slurry is ordinarily filtered. The filtrate or sulfate solution is passed to further processing to recover copper by any suitable method. One such is shown in Figure 1. The presscake, or gangue, is removed from the system.

This filtered sulfate solution is at a relatively high temperature, usually about 100°–110° C., and therefrom must be cooled. It will be supersaturated with copper sulfate when it is cooled. The resultant slurry is, therefore, usually sent to a copper sulfate separator in which the copper sulfate crystals are collected and the mother liquor, comprising aqueous sulfuric acid-ferric sulfate liquor, is recycled. Certain types of apparatus are available in which both the cooling and the crystal-collecting operations may be simultaneously conducted. When using such equipment, the two steps as shown in Figure 1 may be combined into a single operation.

Before continuing with the treatment of the copper sulfate, it perhaps should be noted how the residual mother liquor is recirculated. Pure copper sulfate can be crystallized from solutions containing both copper and iron sulfates only as long as the copper-iron ratio is greater than one. It is a principal purpose of the replacement reaction to favorably alter this ratio. However, if there is any iron in the system, there will always be considerable amounts of this liquor after crystallization. This liquor, after crystal separation, will constitute sulfuric acid-ferric sulfate solution of approximately the correct acid content to be used in the copper replacement reaction. It is, therefore, recycled principally for this purpose. However, one other feature should be noted. While sulfuric acid is produced from iron sulfides in the oxidation step, water is lost, due to the bleeding of steam. It is necessary to replace the latter. Therefore, any excess of mother liquor, over that which is required for the replacement operation, is recycled to the oxidation tank. Any circulating load of excess ferric sulfate which this causes has no appreciable effect on the overall capacity.

Continuing with the preferred copper-recovery treatment, crystals obtained from the separator are dissolved. In this connection, several other points might be noted. The solution leaving the oxidizing tank is at a relatively high temperature and contains a high copper sulfate content, so that it becomes readily supersaturated. Accordingly, it may be, and usually must be, diluted at various points to prevent crystallization in other apparatus before the temperature is down to its boiling point at atmospheric pressure. This water will usually be added in blowing the slurry from the oxidation tank to insure against solidification in the reduction valve. It may be added directly to the tank. There is adequate solubility differential between the boiling point at atmospheric pressure and temperatures readily obtained in the cooler to insure adequate crystal separation.

Crystals of copper sulfate obtained from the separator are dissolved and the solution is treated to recover copper metal. One suitable process therefor forms the subject matter of the copending applications for United States Letters Patent Ser. No. 86,156, filed August 8, 1949, by E. S. Roberts, one of the present inventors.

According to the teachings therein, the solution is sent to a reduction tank. In this tank, the solution is treated with copper metal and saturated with a reducing gas. The result is, the reduction of a substantial portion, if not all, of the copper ions from the cupric to the cuprous condition.

Copper metal is ordinarily used in carrying out the reaction. It may be low-grade copper, i. e., cement copper or the like or it may be scrap copper previously utilized for some other purpose. However, since there is no final loss of the metal it is actually feasible to use product copper in the reduction, because of the economies of the present process. It is contemplated that this will be the normal procedure.

The slurry which results from the reduction is filtered. Only the filtrate is passed to the next operation. The residue or presscake may contain considerable amounts of unreacted metal. If so, all or a part thereof may be returned to the reduction tank. This is shown in Figure 1 as an optional flow. Ordinarily, the bulk of this presscake will be returned to the start of the process as additional feed to the replacement tank.

During reduction of the cupric to cuprous copper, carbon monoxide is blown into the solution. This should be carried out until the solution becomes saturated with the gas. To insure its absorption, the temperature should be as low as is practicable. As will be seen from the nature of the flow sheet, there is no particular problem in obtaining such temperatures.

Solution, saturated with reducing gas, is then passed to continuous autoclave, in which it is treated to precipitate a part of the copper metal content. Preferably, an atmosphere of the reducing gas of about 100–150 pounds per square inch gauge in excess of the vapor pressure is maintained on the autoclave and reaction is carried out at about 200–275° C. Somewhat higher temperatures and pressures may be used if it is necessary or desirable to do so.

At this point, it may be well to consider the possibility of variations in the normal flow. For the moment, consider the material leaving the oxidation tank. In treating some source materials, the gangue content of this exit material will be small. If so, the filtering step may be bypassed, because the filter, which follows the reduction step, will remove these small amounts of gangue. In such case, the amount of copper metal which leaves the reduction step should be maintained low; and there being no particular copper content therein, it can be discarded, rather than recycled to the replacement operation. The solution leaving the oxidation tank, in that case, will be passed directly to the cooler.

Further, in treating some materials, with sufficient care, a comparatively pure copper sulfate solution can be taken from the oxidation tank. When that occurs either of two alternatives may be open. Solution from the oxidation tank may be placed directly in the reduction step, the necessary cooling being provided either by dilution in the oxidation tank in the reducing valve, or by adding sufficient amount of water to the reduction tank. The second alternative is to pass the solution to the cooler and from the cooler, the resultant slurry is passed to a dissolving tank in which sufficient water is added to insure complete solution of copper salts. Again, in this situation, the solution from the dissolver may be decanted, leaving any small amounts of gangue in the tank from which it can be discarded.

Returning to the consideration of the main flow, filtered saturated reduced copper solution is passed to an autoclave. As was noted above, several operations in the present process may be quite critical in the manner in which they are carried out. The optimum temperature and pressure ranges have been stated above. Exact conditions within these limits depend upon the treating time. These three factors are so balanced as to precipitate only a part of the available copper, this being critical for several reasons.

As was noted above, product copper must have a copper content of 99.9% or greater. It is a particular advantage of the present invention that it is perfectly feasible to produce continuously the copper powder which will analyze 99.94–99.99% pure copper.

To insure this result, it is necessary to precipitate only part of the available copper in the autoclave. The requisite grade is obtained only when the copper is precipitated under certain conditions. Precipitation should be stopped when the precipitate falls below this grade. Experience has shown, that optimum operation, to insure the desirable result, usually constitutes precipitating about 60–70% of the theoretically available copper in the solution coming to the autoclave. Of course, a smaller amount may be precipitated but it is not efficient to do so. In some cases, it is possible to go well above the 70% limit.

The remaining solution, containing unprecipitated copper equivalents, is recycled. Ordinarily, it is recycled to the replacement operation. This is, as noted above, a novel operation in this invention. The extent of the replacement is governed, to some extent, by the iron sulfide content in the feed.

Most ore concentrates which require treatment by the present process, will contain sufficient iron to more than utilize any copper recycled to the replacement. Where the iron content is low, the feed rate is simply stepped up. If the iron content is so low that this will overload the apparatus, the ore does not require treatment by the present invention. Such ores do exist, but are becoming more and more scarce.

Some ores will contain iron in excess of those amounts which can be handled without using the replacement operation of the present invention, but not sufficiently at desirable feed rates to utilize all the copper which it is desirable not to precipitate in the autoclave. For that purpose, an optional flow line is shown in the drawing. The excess copper solution, in that case, is returned directly to the oxidation tank.

It will be noted from the foregoing that the replacement operation is highly flexible in its capabilities. In the overall process of Figure 1, it can handle any type of ore concentrate containing mixed sulfides of iron and copper, and also copper oxide minerals, if they are present. The iron:copper ratios in the feed, which can be treated according to the process of Figure 1, range from those which are just too high to be treated without operating the replacement reaction, up to those in which the iron:copper ratio is somewhat higher than that required to precipitate all the copper in the solution which it is desirable to recycle as autoclave discharge. This covers a rather wide range.

It should be noted that the final production of pure copper metal powder not only involves partial precipitation in any one cycle, but preferably utilizes a certain amount of copper for a reduction operation. These features, as noted, were discussed in the copending application for United States Letters Patent, Serial No. 86,156, of E. S. Roberts. While any other process which provides a solution containing copper ions for recycling may be substituted, if so desired, this treatment is highly desirable in an optimum operation. While only a portion of the available copper in the autoclave is precipitated, the overall process is really substantially one hundred percent efficient. The recycled copper ions is in amount a substantially continuously circulating load. Precipitated copper, over and above that added in the reduction step as copper metal, will constitute substantially one hundred percent recovery of the copper content of the feed at the rate at which it is being treated during continuous operation.

It is readily possible, by a slight modification of the flow sheet, Figure 1, to provide for the handling of ores having a much higher iron content. Such a procedure is briefly shown in Figure 2. The process shown in Figure 2 differs essentially from that of Figure 1 only in providing for a preliminary oxidation.

Figure 2:
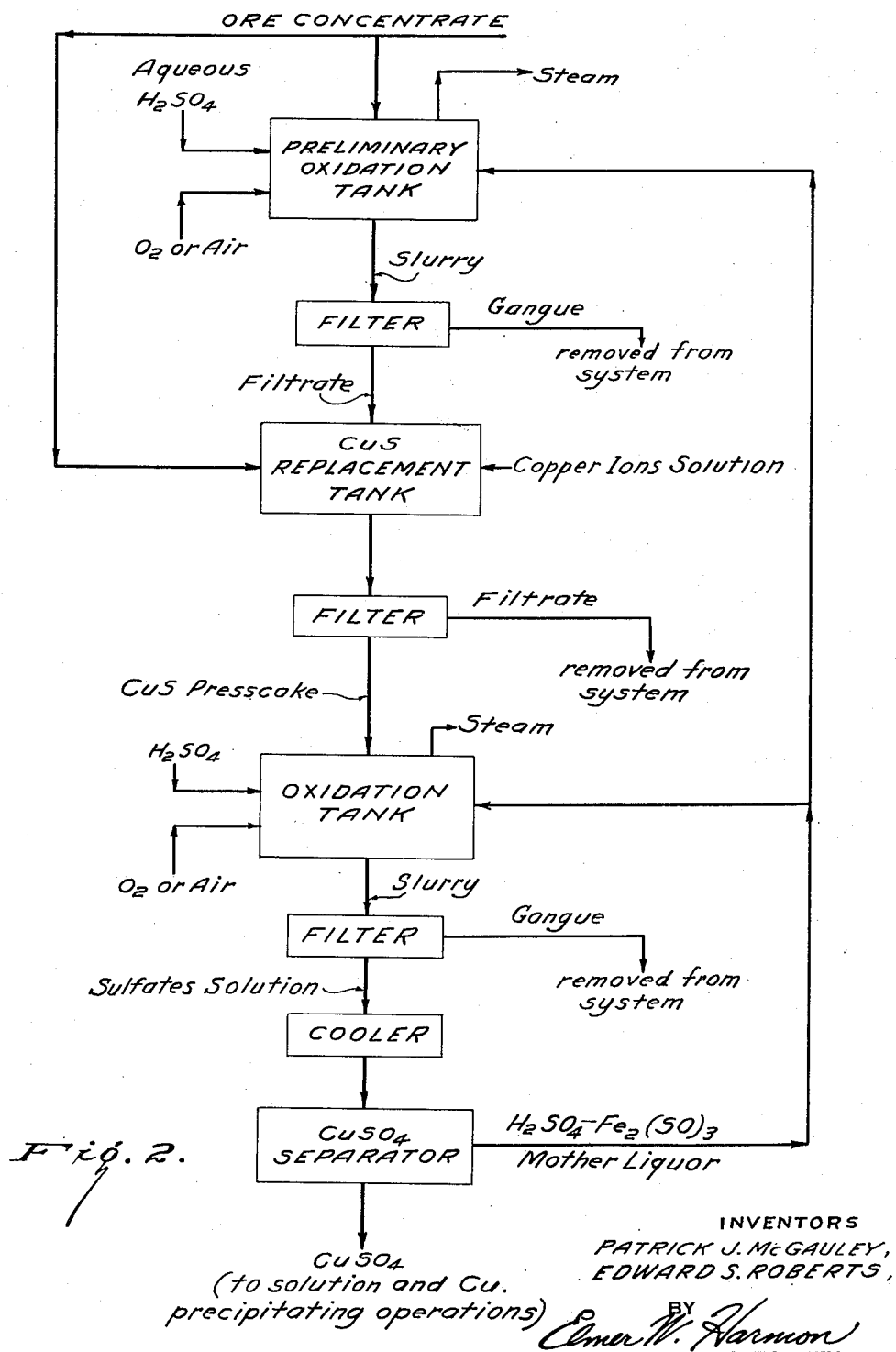
Figure 2 is an additional flow sheet showing a useful modification in which feed is pretreated before being passed to the process such as that of Figure 1.

As shown in Figure 2, feed concentrate is not passed directly to the replacement, as in Figure 1. Rather, a part of the feed is passed to a preliminary oxidation tank. In this tank, the same operation is carried out as was done in the oxidation tank previously discussed in connection with the process of Figure 1. The same general operation conditions should apply.

Oxidized slurry obtained from this tank is passed to a suitable preliminary filter, preferably of a continuous type, presscake from this filter is discarded from the operation of the present process. Filtrate from this preliminary filter, which will contain one mol of dissolved copper for each mol of available copper in the feed to the preliminary oxidation, is used to treat additional amounts of feed concentrate in the replacement tank. Operation of the replacement is otherwise the same as the flow of Figure 1. As a net result, a slurry is obtained which will contain the copper sulfide of the concentrate fed to the replacement, plus copper sulfide in amounts equivalent to the copper in solution in the preliminary filtrate and in the recycled autoclave liquor.

After filtration, the presscake has an iron content which is less than the total in the feed, by the soluble ferrous sulfate equivalent of the available copper in solution, and that converted to ferric sulfate in the preliminary oxidation. Thus, the copper:iron ratio in the feed to the oxidation tank is quite high, as compared to the ratio in the feed concentrate. The filtrate which contains the ferrous sulfate and other soluble miscellaneous ions, is sent, as in Figure 1, to some further treatment. The oxidation tank, to which the copper sulfide presscake is taken, corresponds exactly to the oxidation tank in the process of Figure 1. It again is operated under the same general requirements and a sulfates solution is produced in the same way.

To indicate similarities in the flow, from this point on, in Figure 2, the start of the treatment of this oxidized slurry is shown. It is filtered, the gangue being removed from the system, the filtrate cooled, and the cooled slurry sent to the copper sulfate separator. From the latter, the mother liquor is recycled. Since, in this flow sheet two oxidation reactions are being carried out recycling the mother liquor is done to both tanks as needed. The requirements of the principal oxidation tank is first supplied, and any excess is used in the preliminary oxidation tank. The copper sulfate product which is obtained from the separator is then dissolved and treatment continued, as in the process of Figure 1.

It is believed that the operation of the process of the present invention is clearly apparent from the foregoing discussion. Briefly summarized, it constitutes a combination of steps. A mixed copper ore is treated with copper ions in solution and with a sulfuric acid-ferric sulfate solution, which by replacement produces an enriched copper sulfide slurry and reduces the iron sulfide content. The enriched copper sulfide presscake, containing some iron sulfides, is subjected to oxidation in the presence of sulfuric acid. If necessary, these steps may be repeated as shown in Figure 2. In either case, the resultant solution is treated to obtain copper sulfate. A solution of the latter, preferably after purification by crystallization and redissolving, and preferably in the form of cuprous ions by reduction, is then treated to precipitate about 60-70% of its copper content, as powder meeting the electrolytic standards. The residual dissolved copper, together with the copper sulfate mother liquor, is also recycled to the replacement tank, wherein it is used to treat additional fresh feed.

We claim:

1. An improved process for treating a copper-bearing solids mixture, at least a part of which comprises sulfides of copper and of iron and in which the copper-iron ratio is too low for effective recovery of copper by direct acid leaching, to dissolve and recover the copper content thereof while eliminating iron, which process comprises: admixing a portion of said solids mixture with a volume of aqueous sulfuric acid treating liquor containing copper ions, said portion of solids having an iron content chemically equivalent to at least a major portion of the dissolved copper in said liquor; continuing the treatment of said solids with said volume of liquor until precipitation of copper from solution as copper sulfide with the concomitant solution of a chemical equivalent of iron as ferrous sulfate substantially ceases, said volume of liquor being at least sufficient for its copper content, to produce in the solid residue a copper-iron ratio appreciably greater than unity; filtering the treated mixture; removing the ferrous sulfate-containing filtrate from the circuit; treating the resultant copper-sulfide-enriched presscake by gaseous oxidation in the presence of aqueous sulfuric acid, whereby the copper and iron content thereof is converted to a solution of dissolved sulfates; removing copper from said solution in amount substantially equivalent to the copper dissolved from said portion of said solids and returning the residual copper bearing liquor as treating liquor for an additional portion of solids mixture.

2. A process according to claim 1, in which one portion of said solids mixture is subjected to a preliminary oxidation in the presence of a solution containing ferric sulfate and an excess of sulfuric acid, with a member of the group consisting of oxygen, air, and oxygen-enriched air; the resultant treated slurry is filtered; the presscake is removed from the circuit; and the filtrate is used as a part of said treating liquor.

3. A process according to claim 1, in which said gaseous oxidation is carried out with a member of the group consisting of oxygen, air, and oxygen-enriched air, said oxidation being exothermic; sufficient steam is bled from the reacting mixture to prevent the temperature exceeding about 325° C. and sufficient water is introduced into the reacting mixture to maintain all the soluble sulfates in solution at the reaction temperature.

4. A process according to claim 3, containing the additional steps of cooling the resultant sulfates solution, whereby a part of the copper sulfate is crystallized, collecting the crystallized copper sulfate; recycling a portion of the residual liquor as leaching solution and the remainder as part of said treating liquor.

PATRICK J. McGAULEY.
EDWARD S. ROBERTS.

REFERENCES CITED

The following references are of record in the file of this patent:

UNITED STATES PATENTS

| Number | Name | Date |
| --- | --- | --- |
| 924,076 | Jumau | June 8, 1909 |
| 1,588,806 | Pike et al. | June 15, 1926 |

FOREIGN PATENTS

| Number | Country | Date |
| --- | --- | --- |
| 15,849 | Great Britain | 1911 |